Nov. 10, 1925.
W. E. MENZIES
1,561,267
SPEED REGULATOR SYSTEM
Filed Jan. 20, 1922
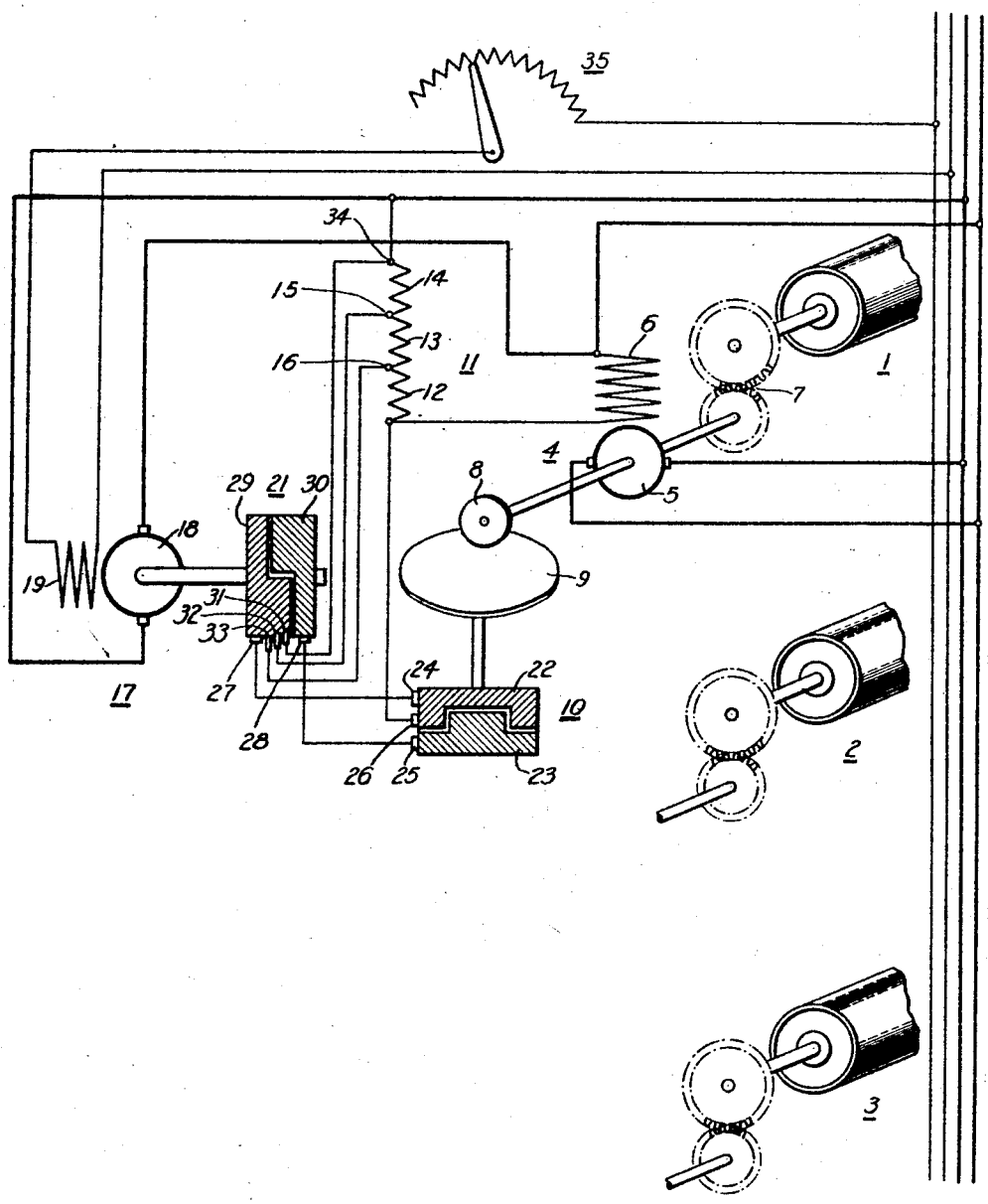
WITNESSES:
INVENTOR
William E. Menzies
BY
ATTORNEY Patented Nov. 10, 1925.

1,561,267

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed January 20, 1922. Serial No. 530,709.

*To all whom it may concern:*

Be it known that I, WILLIAM E. MENZIES, a citizen of the United States, and a resident of Irwin, in the county of Westmoreland and State of Pennsylvania, have invented a new and useful Improvement in Speed-Regulator Systems, of which the following is a specification.

My invention relates to speed-regulator systems and it has special relation to systems for maintaining a predetermined speed ratio between rotating members.

My invention is an improvement upon the system disclosed in my copending application, Serial No. 350,734, filed Jan. 12, 1920.

The object of the present invention is to provide means whereby difficulties arising from poor commutation will be largely avoided.

A system such as is illustrated herein is useful where large motors and correspondingly large currents are involved. It is illustrated as applied to paper mills.

In the accompanying drawing, the single figure is a diagrammatic illustration of a regulator system embodying my invention.

The roll units 1, 2 and 3 are each adapted to be driven by a motor 4, comprising an armature 5 and a shunt field-magnet winding 6, through suitable gearing 7. Also mounted upon the shaft of the motor 4 is a friction wheel 8, which co-operates with a friction disk 9 to operate a commutator device 10. Any other well-known form of speed-changing device may be used so that the speed at which the commutator device 10 is rotated may be adjusted.

The circuit of the field-magnet winding 6 includes a resistor 11 comprising three sections 12, 13 and 14 that are divided by intermediate taps 15 and 16. A constant-speed motor 17, comprising an armature 18 and a separately-excited field-magnet winding 19, is adapted to operate a plurality of commutator devices, one only of which is illustrated at 21.

The commutator device 10 comprises two similarly-shaped segments 22 and 23, having interlacing tongues or projections, respectively co-operating with which segments are brushes 24 and 25. A brush 26 is so mounted as to alternately engage with segments 22 and 23, and is connected to one side of the resistor 11. The brushes 24 and 25 are connected to brushes 27 and 28, respectively co-operating with commutator segments 29 and 30 of the commutator device 21, which is similar to the device 10.

Three brushes 31, 32 and 33, circumferentially displaced relatively to each other, are so disposed as to co-operate with the commutator segments 29 and 30 alternately. The brushes 32 and 33 connect directly to taps 15 and 16 of the resistor 11, while brush 31 is connected to terminal 34 of resistor 11. The three brushes 31, 32 and 33, being circumferentially displaced upon the commutator 21, pass from one commutator segment to another one after another, cutting out sections of the resistor 11 in sequence, thus making a more gradual change in field resistance, and a lesser tendency to spark at the brushes than if the entire resistor were cut in and out of the field circuit at once.

A rheostat 35 is connected in the circuit of the field-magnet winding 19 of the motor 17 to permit adjusting the speed of operation of the motor.

In operating the foregoing system as a speed-regulator for a single unit, the commutator device 10 is operated proportional to the speed of the motor 4, the speed of which it is desired to regulate. The commutator device 21 is adapted to be operated at a constant speed, by reason of the characteristics of the motor 17. The commutator devices are adapted to control the sections of the resistor 11 through the electrical connections between it and the commutator devices.

When the commutator devices 10 and 21 are rotating synchronously, circuits are alternately completed through the two commutator devices to intermittently short-circuit the sections 12, 13 and 14 of the resistor. If the speed of the commutator device 10 varies relatively to the speed of the commutator device 21, the proportion of time that the sections of the resistor 11 are short-circuited will be correspondingly varied. This variation may occur between the limits wherein the resistor 11 is completely out of the circuit of the field-magnet winding 6 and wherein the resistor is maintained continually in the circuit of that field-magnet winding.

The commutator devices are displaced 180° relatively to each other at the indicated limits. By providing a plurality of brushes 31, 32 and 33, and a plurality of resistor sections, relatively small changes in current and voltage are possible at each make-and-break of the circuit at the corresponding points.

A similar arrangement of apparatus and circuits is provided for each of the roll units 2 and 3, and the commutator devices 21 are all adapted to be mounted upon the shaft of the single motor 17 to be rotated at a constant speed. Accordingly, by varying the rheostat 35 in the circuit of the field-magnet winding of the constant-speed motor 17, it will be apparent that the speed of the entire system may be raised or lowered simultaneously. Moreover, this result may be accomplished without varying the speed ratio at which the various units are operated.

Modifications in the system and arrangement and location of parts may be made within the spirit and scope of my invention, and such modifications are intended to be covered by the appended claims.

I claim as my invention:—

1. In a regulator system, the combination with a motor comprising an armature and a field-magnet winding, a resistor divided into sections by a plurality of taps and located in the circuit of said field-magnet winding, and a commutator device operated by said motor, of a second motor, and a commutator device operated thereby, one of said commutator devices having a plurality of brushes co-operating therewith respectively connected to said taps and to opposite terminals of said resistor.

2. In a regulator system, the combination with a motor having an armature and a field-magnet winding, a sectional resistor in circuit with said field-magnet winding, and a commutator device operated by said motor, of a second commutator device, means adapted to operate said second commutator device, and a plurality of brushes co-operating with one of said commutator devices and connected to the sections of said resistor in a manner to effect intermittent short-circuiting of said sections.

3. In a regulator system, the combination with a motor having an armature and a field-magnet winding, and a sectional resistor in circuit with said field-magnet winding, of a plurality of commutator devices having a plurality of staggered brushes co-operating therewith and adapted to intermittently complete shunt circuits for the sections of said resistor.

4. In a regulator system, the combination comprising a plurality of motors, a sectional resistor in circuit with each motor, a speed-changing device operated by each motor, a commutator device operated by each of said speed-changing devices, and a plurality of constant-speed commutator devices, one of said commutator devices having a plurality of brushes respectively connected to the individual sections of one of said resistors.

5. In a regulator system, the combination comprising a plurality of motors, a sectional resistor in circuit with each motor, a speed-changing device operated by each motor, a commutator device operated by each of said speed-changing devices, a plurality of constant-speed commutator devices, one set of said commutator devices having a plurality of brushes respectively connected to the sections of the corresponding resistors, and means whereby the speeds of all of said motors may be simultaneously raised or lowered without disturbing the speed ratio therebetween.

6. In a regulator system, the combination with a motor, a sectional resistor associated with said motor and a speed-changing device operated thereby, of a commutator device operated by said speed-changing device and a constant-speed commutator device, one of said commutator devices having a plurality of brushes displaced with respect to each other and connected to the sections of said resistors to intermittently short circuit said sections during each revolution of said commutator device.

7. In a regulator system, the combination with a plurality of motors, a sectional resistor associated with each motor, a speed-changing device operated by each motor, and a commutator device operated by each of said speed-changing devices, of a plurality of constant-speed commutator devices, one of said commutator devices having a plurality of brushes circumferentially displaced with respect to each other to successively short-circuit said resistor sections, said commutator devices co-operating to control said resistors.

8. In a regulator system, the combination with a plurality of motors, a sectional resistor associated with each motor, a speed-changing device operated by each motor, and a commutator device operated by each of said speed-changing devices, of a plurality of constant-speed commutator devices, one of said commutator devices having a plurality of brushes circumferentially displaced with respect to each other to successively short-circuit said resistor sections, said commutator devices co-operating to control said resistors to maintain a predetermined speed ratio between said motors, and means whereby the speeds of all of said motors may be simultaneously raised or lowered without disturbing the speed ratio therebetween.

In testimony whereof, I have hereunto subscribed my name this 4th day of January 1922.

WILLIAM E. MENZIES.